United States Patent
Moran

Patent Number: 6,009,423
Date of Patent: Dec. 28, 1999

[54] SEARCH APPARATUS

[75] Inventor: Paul J. Moran, Hemel Hempstead, United Kingdom

[73] Assignee: 3Com Technologies, Cayman Islands

[21] Appl. No.: 08/960,239

[22] Filed: Oct. 29, 1997

[51] Int. Cl.$^6$ ..................................... G06F 17/30
[52] U.S. Cl. .................... 707/5; 707/2; 707/8; 707/1; 707/3; 395/200.51; 395/200.58
[58] Field of Search ................... 707/1, 2, 3, 8, 707/5; 395/200.5, 200.8, 200.57, 200.58, 200.68, 200.51; 370/254, 349, 389, 392, 401, 402, 395, 399, 465, 410; 380/49, 23; 340/825.05; 708/491, 493, 628, 656

[56] References Cited

U.S. PATENT DOCUMENTS

| | | | |
|---|---|---|---|
| 3,916,387 | 10/1975 | Woodrum | 340/172.5 |
| 5,032,987 | 7/1991 | Broder et al. | 364/200 |
| 5,343,471 | 8/1994 | Cassagnol | 370/85.13 |
| 5,490,258 | 2/1996 | Fenner | 395/401 |
| 5,715,250 | 2/1998 | Watanabe | 370/395 |
| 5,732,071 | 3/1998 | Saito | 370/255 |
| 5,757,795 | 5/1998 | Schnell | 370/392 |
| 5,757,924 | 5/1998 | Friedman | 380/49 |
| 5,758,070 | 5/1998 | Lawrence | 395/200.5 |
| 5,790,541 | 8/1998 | Patrick | 370/392 |
| 5,821,937 | 10/1998 | Tonelli | 345/356 |
| 5,841,991 | 11/1998 | Russell | 395/200.51 |
| 5,852,607 | 12/1998 | Chin | 370/401 |

FOREIGN PATENT DOCUMENTS

| | | | |
|---|---|---|---|
| 0 520 116 A1 | 12/1992 | European Pat. Off. | G06F 15/40 |
| 0 522 743 A1 | 1/1993 | European Pat. Off. | H04L 29/06 |
| 0 594 196 A1 | 4/1994 | European Pat. Off. | H04L 12/46 |

*Primary Examiner*—Paul R. Lintz
*Assistant Examiner*—Diane D. Mizrahi
*Attorney, Agent, or Firm*—Wilson Sonsini Goodrich & Rosati

[57] ABSTRACT

A search apparatus and method for establishing efficiently whether a particular number, eg a MAC address, is stored in a database, eg in a communications bridge. The search is conducted stepwise on the basis of portions of the number, until one or zero match is found in the database. In the event that one match is found, a final confirmation is made that the whole of the number located and the number searched for are the same. This provides an efficient way to search among a subset of possible very large numbers.

16 Claims, 2 Drawing Sheets

| ? bits | 15 bits | 4 bits | 1 bit |
|---|---|---|---|
| first search table base address | index of Search Table entry | portion of MAC address | 0 |

| Index | MAC Address | PORT | Data |
|---|---|---|---|
| &00 00 | A | 4 | ............ |
| &00 01 | | | |
| &00 02 | C | 2 | ............ |
| ... | ... | ... | ... |
| &1F FB | | | |
| &1F FC | E | 3 | ............ |
| &1F FD | B | 4 | ............ |
| &1F FE | D | 1 | ............ |
| &1F FF | | | |

FIG. 1

| 48 bit MAC Address ||||||||| 
|---|---|---|---|---|---|---|---|---|
| 24 bits |||||| 24 bits |||
| 4 bits | 4 bits | 4 bits | 4 bits | 4 bits | 4 bits | 4 bits | 4 bits | 16 bits |
| 9th lookup | 8th lookup | 7th lookup | 6th lookup | 5th lookup | 4th lookup | 3rd lookup | 2nd lookup | 1st lookup |

FIG.2

| 1 bit | 15 bits |
|---|---|
| type | index |

FIG. 3

| ? bits | 16 bits | 1 bit |
|---|---|---|
| Main Search Table base address | portion of MAC address | 0 |

FIG. 4

| ? bits | 15 bits | 4 bits | 1 bit |
|---|---|---|---|
| first search table base address | index of Search Table entry | portion of MAC address | 0 |

FIG. 5

| ? bits | 15 bits | n bits |
|---|---|---|
| Address Table base address | index of Address Table entry | 0 |

FIG. 6

SEARCH APPARATUS

BACKGROUND OF THE INVENTION

1. Field of the Invention

The present invention relates to a search mechanism and associated implementations for locating quickly and efficiently items of data associated with a given identifier. It is particularly useful in communication hubs such as bridges which are used in computer communication networks.

2. Description of Related Art

Computer networks are typically made up of a number of devices, eg user stations, data storage devices, output devices, etc, which are arranged to be able to communicate with each other. This is achieved by interconnecting the devices by way of communication hubs. The simplest form of such a hub is a repeater. A hub in general terms has a plurality of ports, to each of which a network device or another hub may be connected. A repeater functions to output each communication received on any port to each of the other ports. This ensures that any communication sent by any device reaches all other devices connected to the repeater, and thus reaches its intended destination, although a considerable number of unnecessary communications appear on the network.

This is not a problem when the volume of communications traffic on the network is relatively low but problems can occur in high volume situations when communication between network devices can be noticeably slowed.

Another type of known network communication hub, the bridge or switch, attempts to reduce this problem. In particular a bridge, when it receives a communication on a particular port outputs it only to that port or those ports necessary for the communication to reach its intended destination(s). To enable a bridge to function in this manner it is necessary for the bridge to maintain a database which relates intended destinations of communications packets to the ports of the bridge. On receipt of a communication the bridge must read from the data base the port associated with the intended destination of the packet and output it accordingly.

In the Ethernet network standard all network devices are identified by a Media Access Control (MAC) address. These addresses are made up of 48 bits (6 bytes) enabling a very large number of devices ($2.8 \times 10^4$) to be uniquely identified. It is recognised however that a given bridge need only store details of a limited number of MAC addresses. This is because only a limited number of devices will communicate via any given bridge, and also it is known that it is not necessary to maintain details of a MAC address for longer than a predetermined time after its last use. The "timing out" of MAC addresses may occur for instance 15 minutes after the last use.

Thus it has been proposed that a bridge should store details of 8000 MAC addresses. These details would include, as mentioned above, the port of the bridge with which that MAC address is associated. Other information, such as the time of last use, may also be stored related to each MAC address.

In operation it is therefore necessary on reception of a packet, to search on the basis of the destination MAC address to find which port or ports of the bridge the packet should be sent to. Given that within the fast Ethernet standard communications may occur at speeds up to 100 Megabits per second (100 Mbps), in order for the bridge to keep up with the communications, it is necessary to perform the look-up in 6 $\mu$s.

SUMMARY OF THE INVENTION

The problem addressed by the present invention therefore is to provide a search structure which can be efficiently searched and which when implemented in the context of a bridge as mentioned above enables the efficient location of data associated with a given 6-byte address.

The present invention provides a device arranged to establish if a particular one of all possible M-digit numbers is stored in a storage means, said storage means being capable of storing a subset of possible M-digit numbers, the device comprising:

search table means having entries stored therein;

means arranged to recover one or more entries sequentially from said search table means on the basis of specified portions of said M-digit number until the recovered entry indicates either that there is only one M-digit number stored in said storage means which matches said specified M-digit number in the specified portion or portions so far used, or that there are no such M-digit numbers stored in said storage means; and means arranged to confirm whether the one M-digit number identified in the former case is the same as said specified M-digit number.

In the preferred embodiment the specified portions are selected such that portions of said M-digit number which are more likely to vary in said stored subset are used before portions which are less likely to vary.

Also in the preferred embodiment said search table means comprises a main search table from which an entry is recovered on the basis of the first specified portion of the specified M-digit number and a plurality of subsidiary search tables, each entry recovered from the main or a subsidiary search table comprising one of (i) the address of the one M-digit number stored in said storage means, (ii) a pointer to the subsidiary search table from which an entry should be recovered on the basis of the next specified portion of the Migit number, and (iii) an indication there are no matching M-digit numbers stored in said storage means.

An implementation of the invention is a communications device comprising a plurality of ports to each of which a computing device may be attached, and which is arranged to receive communications from said computing devices and to transmit said communications from the port or ports necessary for the communications to reach their intended destination(s), said device comprising means for determining, for each received communication, an intended destination address, storage means for storing a subset of the possible destination addresses and information regarding with which of said ports each of said subset is associated, and search means arranged to establish if said intended destination address is stored in said storage means, said search means comprising:

search table means having entries stored therein;

means arranged to recover one or more entries sequentially from said search table means on the basis of specified portions of said intended destination address until the recovered entry indicates either that there is only one address stored in said storage means which matches said intended destination address in the specified portion or portions so far used, or that there are no such addresses stored in said storage means; and means arranged to confirm whether the one address identified in the former case is the same as said intended destination address.

In a further aspect the present invention is a method of establishing if a specified one of all possible M-digit numbers is stored in a storage means, said storage means being capable of storing a subset of all possible M-digit numbers, the method comprising:

searching sequentially on the basis of specified portions of said specified M-digit number until it is established either that there is only one M-digit number stored in said storage means which matches said specified M-digit number in the portion or portions so far used, or that there are no such M-digit numbers stored in said storage means; and confirming, in the former case, whether the one M-digit number located is the same as said specified M-digit number.

It should be noted that this invention, while it is described in the following with particular reference to binary numbers is also applicable to searching for numbers expressed in any numerical base, for instance octal, decimal or hexa-decimal.

Because, in searching a storage means which, as described above, can only store a subset of all the possible numbers, it is not necessary to search on the basis of the complete number to identify corresponding location, if present, in the storage means, the present invention provides a particularly efficient way of locating the entry in the storage table.

In the above defined arrangement it is preferred that the first recovery of an entry from the search table means is done on the basis of a portion of the M-digit number involved which is relatively highly likely to vary between the numbers stored in the storage means. This increases the likelihood of locating the number in the storage means in only one searching step.

Also preferably the confirming means performs the confirmation by comparing only the portion or portions of the located M-digit number and the specified M-digit number which are not used in the first searching step. It is unnecessary to use more than this of the numbers for this purpose and this feature simplifies the confirmation procedure.

As mentioned above, a preferred implementation of this invention is in a context where it is desired to recover, very rapidly, data associated with a particular specified number. In such a case, that data is also stored in the storage means and can be recovered once it is established that the number in question is currently in the storage means.

In particular, in this aspect, this invention provides a bridge device for a computer network having a plurality of ports via which communication between network devices each having a MAC address, can occur, which comprises a device as defined above in which the storage means is arranged to store known MAC addresses and the ports with which they are associated and means to identify the intended destination MAC address of an incoming communication and to recover, from said storage means, the port associated with said destination MAC address.

BRIEF DESCRIPTION OF THE DRAWINGS

The present invention will be better understood from the following exemplary description of preferred embodiments in conjunction with the accompanying drawings, in which:

FIG. 1 illustrates the format of the Address Table in the particularly preferred embodiment;

FIG. 2 illustrates die format of a typical 6 byte MAC address;

FIG. 3 illustrates the format of a search table entry in the particularly preferred embodiment;

FIGS. 4, 5 and 6 illustrate the structures of the addresses in the particularly preferred embodiment.

DESCRIPTION OF THE PREFERRED EMBODIMENTS

Figure 7:
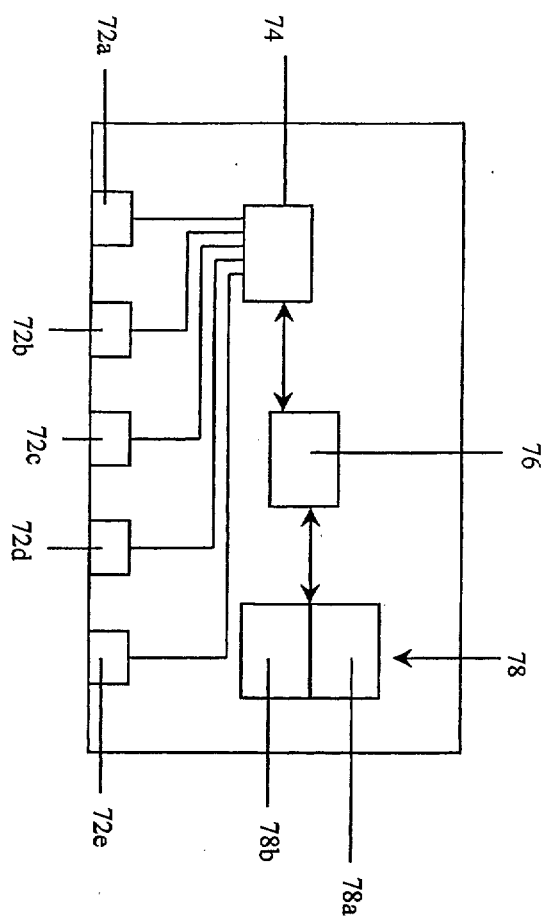
FIG. 7 is a schematic diagram of a bridge in which the invention is implemented.

The preferred embodiments of this invention will be described in the following in the context of the accessing of information associated with a MAC address of the type described in general terms above. In particular, this embodiment of the invention is intended to be implemented in a bridge device in a computer network where it is desired to be able to look-up very rapidly details of the bridge port with which a particular MAC address is associated.

The first important component of the arrangement is the main Address Table. The Address Table stores MAC address and data associated with those addresses. As mentioned above, a MAC address is made up of six bytes and therefore there are a very large number of possible MAC addresses. However, it is known to be sufficient to have the facilities in a bridge for storing approximately 8000 MAC addresses and associated data. Each entry in the Address Table stores one MAC address and its associated data, for example the port with which the addresses is associated. Other data which may be stored in association with each MAC address includes security for the particular address, the priority associated with the address and ageing information.

The second major component of the search arrangement is a main search table which is used to conduct the first stage of the database search. In the first stage of the database search, an entry is recovered from the main search table on the basis of a specified portion of an incoming MAC address it is desired to locate in the Address Table. The search table entry thus located can indicate one of three things.

Firstly, the search table entry may indicate that there is no MAC address stored in the Address Table which matches the specified portion of the incoming MAC address on the basis of which the entry was located. In this case the search is terminated and the incoming MAC address is noted as an unknown address.

Secondly, the search table entry may indicate that there is only one MAC address currently stored in the Address Table which matches the incoming MAC address in the specified portion. In this case, the search table entry also provides information giving the location of that one MAC address in the Address Table. At this stage, the located MAC address is recovered from the Address Table, and a confirmation is carried out to check that it is the same MAC address as the incoming address.

Thirdly, the search table entry may indicate that there is more than one MAC address stored in the Address Table which matches the incoming MAC address in the specified portion. In this case, the search table entry provides an index on the basis of which the next stage of the search can be carried out.

This next stage of the search is carried out in the third main component of the searching structure, which is an array of small search tables. Essentially, the small search tables are dynamically configured such that at any given time there is one small search table existing for each occurrence of one of the third type search table entries mentioned above. Thus, when in the first stage of the search it is established that there is more than one MAC address in the Address Table which matches the incoming MAC address in the first specified portion, the next stage of the search is carried out in the corresponding small search table. That small search table is searched on the basis of a second specified portion of the incoming MAC address and once again a search table entry is produced. There are the same three options for what this search table entry may indicate as discussed above for the entries produced from the main search table. Therefore, the search will either terminate because it is established that the incoming MAC address is not currently stored in the Address Table, an index into the main Address Table is provided and the confirmation step can be carried out, or it is established that the MAC address in the Address Table is not yet identified. This is the case if there is more than one MAC address in the Address Table which matches the incoming MAC address in both the first and second specified portions of the address. Once again in this case what is recovered is an index to a further small search table.

It is therefore possible, although unlikely, that it will be necessary to search successively through sufficient small search tables that in fact the search is conducted on the basis of the whole of the incoming MAC address. This would of course be necessary if there are two very similar MAC addresses stored in the Address Table which differed only in the portion of the MAC address on which the final searching stage is carried out.

However, as will be discussed in more detail below it is possible to optimise the searching configuration such that it is extremely unlikely that more than two or three searching steps will be necessary to identify whether a particular MAC address is currently stored in the Address Table.

In the following details of a particularly preferred implementation in the context of searching for MAC addresses in a bridge is described with numerical values for the aspects of the implementation, which values are given by way of example. It will be apparent from this description how the arrangement of this invention could be configured for searching for addresses other than six byte MAC addresses.

FIG. 1 illustrates the format of he Address Table in which details of the currently known MAC addresses are stored. As will be seen, each presently known MAC address, illustrated by entries A, B, C, D and E, is stored at a location in the Address Table together with its associated data. As illustrated, one of the pieces of information stored in association with each MAC address is the port number of the bridge with which the particular MAC address is associated. There may also be stored other data relating to each known MAC address. For reasons which will become apparent from the following description, there may be up to 32,768 ($2^{15}$) Address Table entries. However, it is generally recognised that providing the facility for having approximately 8000 entries is sufficient. The Address Table is therefore illustrated in FIG. 1 having 8192 ($2^{13}$) entries indexed accordingly.

FIG. 2 illustrates the format of six byte MAC address and the way in which it is divided up for searching according to the present implementation. As shown, the first look-up stage uses the least significant 16 bits of the MAC address. It has been found that the least significant bit of the MAC address are those bits of the address which are most likely to vary among the addresses associated with a particular bridge, and therefore the searching efficiency is optimised by using this portion of the address in the first stage of the search.

This first look-up stage uses these 16 bits to index into the main search table. The number of bits used in the first look-up stage dictates the required size of the main search table, and therefore in the present implementation the main search table must have 65,536 ($2^{16}$) entries. The lowest 16 bits of the MAC address are simply used as an index into the main search table to recover one of the search table entries in the search table.

FIG. 3 illustrates the format of a search table entry, each of which is 2 bytes long. The first bit of the search table entry indicates its type and the remaining 15 bits are an index. The type field of the search table entry is indicative of the meaning of the index in the remaining 15 bits. In particular, it indicates whether the index is an index into the Address Table (in the preferred embodiment this is indicated by the type field being zero) or if the index identifies a small search table (in the preferred implementation this is indicated by the type field being 1).

If the type field of the recovered search table indicates that the index is an Address Table index the look-up stage of the procedure is complete and the procedure can move to the confirmation stage which is described later.

If the type field of the search table entry indicates that the index is a search table index then the index portion of the search table entry is an index which identifies one of the small search tables.

As discussed above there is a third condition which can be indicated by the search table entry, that is the situation where there is no MAC address stored in the Address Table which has a least significant 16 bits corresponding to the 16 bits which have been used in the first look-up stage. This situation is indicated by providing a specific combination of entries in the type field and index field of the search table entry. In the preferred embodiment of this invention the situation is indicated by the type field indicating that the index is a search table index, but the search table index being entirely made up of 1 s. Therefore, if the type of the recovered search table entry in the first look-up stage is a search table entry and the index is all 1 s then it is immediately identified that the MAC address being searched for is not in the Address Table and the search is terminated.

If the search table entry recovered has a type which indicates that the index identifies a small search table and the index is not made up of all ones then the search moves onto the next stage. In the next stage the next four bits of the MAC address being searched (see FIG. 2) is used as an index in the small search table identifies by the previously recovered search table entry. As can be seen from FIG. 2 in each of the search stages subsequent to the first one the next four bits of the MAC address are used requiring there to be 16 entries in each small search table. Once again the search in the small search table recovers a particular search table entry which will indicate, in the sane manner as above, whether the index recovered is an index into the Address Table, if it has now been established that the MAC address being searched for is not in the database in which case the search is terminated, or if sufficient searching has not yet been conducted to uniquely identify the MAC address in question, in which case an index to a further small search table is provided for the next look-up stage.

Once a stage is reached where the index recovered in a search table entry is an index into the main Address Table, the procedure moves on to the confirmation stage. In the confirmation stage the MAC address being searched for is compared with the MAC address in the identified position in the Address Table. This is necessary because of course it is possible that the MAC address which is being searched for is in fact one that is not present in the Address Table, but there is present in the Address Table a known MAC address which is the same as the address being searched for in the portions so far used in the searching. In the confirmation stage it is only necessary to compare the most significant four bytes of the MAC address being search for and the MAC address located in the Address Table as it will already have been established in the first look-up stage that the remaining two bytes are the same. This is particularly advantageous in the preferred implementation because it is common to provide 32 bit access to memory. Therefore, it is possible to provide the read from memory to compare the top four bytes of the MAC addresses with a single access to memory.

If the MAC addresses are found to be the same in the confirmation stage then the search has succeeded and the required data associated with the MAC address can be returned. If it is found in the confirmation stage that the MAC addresses are not the same then it has been established that the MAC address being searched for is not in the database and the search is stopped.

FIG. 7 is a schematic diagram of a bridge in which a preferred embodiment of the invention may be implemented. In particular, bridge 70 is provided with a plurality of ports 72, with a representative five ports 72a .. 72e being shown. The ports are connected to bridge controller 74 which functions in a broadly conventional fashion to transit received communication packets to the port or ports necessary for them to reach their intended destination(s). To achieve this, the bridge is provided with search engine 76 associated with storage means 78 which has stored therein details of known MAC addresses, and associated data including, as discussed above, which port each MAC address is associated with.

Any of search engine 76, bridge controller 74 and storage means 78 may be manufactured integrated with each other, but they are illustrated separately to assist understanding the present invention.

Once bridge controller 74 establishes a destination MAC address for the communications packet it is currently processing, it passes the MAC address to search engine 76, which functions to search for that MAC address in storage means 78.

The search structure as described in detail above can be conveniently implemented in storage means 78 in the following fashion. The Address Table stores the data which is to be searched, in portion 78a of storage means 78. As discussed above the Address Table comprises a number of Address Table entries, each of which is a predetermined number of bytes, sufficient to store a 6 byte MAC address and the associated data. In this implementation the Address Table entries are arranged in memory 78a as an array, that is each entry is immediately followed in memory by the next entry. As will be explained in the following, the search engine 76 simply needs to know the start address of the first entry in the Address Table in order to be able to conduct the searching. The search engine 76 does not need to know how many Address Table entries there are.

The search tables which, as described above, facilitate the conduct of the search, are also stored in storage means 78, in particular in portion 78b. As mentioned above the main search table is a fixed size and contains $2^{16}$ search table entries. These search table entries are also arrangement as an array, that is each search table entry is immediately followed in memory 78b by the next entry. The search engine 76 simply requires to know the start address of the first entry in the main search table. The small search tables are also arranged in memory 78b as an array, with each small search table being immediately followed by the next small search table. As described above each small search table contains 16 search table entries and therefore takes 32 bytes.

With the Address Table and search tables arranged in this fashion the calculation of the addresses for accessing the various tables is simply as follows. The calculation of the address of the search table entry for the fast stage of the look-up into the main search table is as illustrated in FIG. 4. As shown the byte address of the search table entry required is simply the main search table base address followed by the 16 bits forming the first portion of the MAC address being searched for followed by an additional zero bit to account for the fact that each search table entry is 2 bytes long.

The small search tables are aligned in memory 78b such that in the following look-up ages the calculation of the address of the search table entry to be recovered from a small search table is as illustrated in FIG. 5. That is, the address of the required search table entry is simply the address of the first small search table base address followed by the index of the search table entry recovered in the previous look-up stage followed by the 4 bit portion of the MAC address relevant to the current search stage, finally followed again by a single bit to account for the fact that the search table entries are 2 bytes long.

The Address Table is aligned in memory 78a such that, after all of the necessary look-up stages, the calculation of the address of the Address Table entry is as illustrated in FIG. 6. That is, the address of the required Address Table entry simply the Address Table base address followed by the 15 bit index of the Address Table entry from the last located search table entry followed by an additional n bits. The number n of additional bits corresponds to the number of bytes which each Address Table entry takes up, and may typically be 8 or 6. The MAC address itself is stored as the first part of the Address Table entry, which allows the confirmation stage to complete without needing an offset into the Address Table entry.

As mentioned above this arrangement is particularly optimised for a computer arrangement having a 32 bit wide database. This means that a single read from memory can recover 32 bits. In such a context, all the search table entries being 16 bits long should be 16 bit aligned in memory to allow each search table entry to be recovered in a single read from memory. The Address Table entry is structured so that the most significant 32 bits of the MAC address stored in the Address Table entry are 32 bit aligned in memory. This means that the top 4 bytes of the MAC address located in the Address Table entry can be read from memory in a single step. Because, as mentioned above, in the confirmation stage it is only necessary to check the top 4 bytes of the located MAC address against the incoming MAC address this arrangement means that the confirmation step can be achieved in a single access to memory.

In such an arrangement the following optimisations are achieved. Each look-up stage consists of a simple internal calculation, which as described above is either arithmetic or simple bit shifting and masking, and a single read of 16 bits of data from memory. The confirmation stage consists of, as mentioned, of a single read of 32 bits of data from memory and a 32 bit comparison. Thus, even in an Address Table containing as many as $2^{15}$ MAC addresses, the worst case scenario for locating a particular MAC address is that the search requires 9 look-up stages and one confirmation stage which requires 10 accesses to memory. However, the best case is of course where only one look-up stage is required plus the confirmation stage, giving a total of 2 accesses to memory, while a typical case requires only 2 look-up stages plus the confirmation stage, therefore requiring only a total of 3 accesses to memory.

The search structure of the present invention can be further optimised according to a particular context in which it is used. In particular if the database requirements are less than the maximum $2^{15}$ addresses then it is possible to arrange the tables such that some data associated with the MAC address can be recovered before the end of the search. This may reduce the amount of data needed to be read once the correct Address Table entry has been located.

For example, in the situation where it is required to store only 4096 ($2^{12}$) addresses in the Address Table, only 12 bits of the index field from the search table entries are required to locate the address in the Address Table. This means that, in the search table entry which gives the final index into the Address Table, there are 3 unused bits. It is possible to use these 3 bits to indicate, for instance, the port which is associated with the located MAC address.

I claim:

1. A device arranged to establish if a particular one of all possible M-digit numbers is stored in a storage means, said storage means being capable of storing a subset of possible M-digit numbers, the device comprising:

search table means comprising a main search table and a plurality of subsidiary search tables having entries stored therein each entry in the main or a subsidiary search table comprising one of (i) an address of one M-digit stored in said storage means, (ii) a pointer to a subsidiary search table from which a further entry should be recovered, and (iii) an end indication being neither a valid said address nor a valid said pointer;

means arranged to recover one or more entries sequentially from said search table means beginning with said main search table on the basis of specified portions of said M-digit number until the recovered entry comprises either a said address being the address of the only M-digit number stored in said storage means which matches said specified M-digit number in the specified portion or portions so far used, or a said end indication indicating that there no such M-digit numbers stored in said storage means; and means arranged to confirm whether the one M-digit number identified in the former case is the same as said specified M-digit number.

2. A device according to claim 1 in which said specified portions are selected such that portions of said M-digit number which are more likely to vary in said stored subset are used before portions which are less likely to vary.

3. A device according to claim 1 in which said M-digit number is a binary number having 48 bits, the main search table having 65,536 entries and the first specified portion of said 48-bit number being a specified 16 bit portion.

4. A device according to claim 3 in which said 16 bit portion comprises the least significant 16 bits of said 48-bit number.

5. A device according to claim 3 in which each specified portion of the 48-bit number subsequent to the first is a specified 4 bit portion.

6. A communications device comprising a plurality of ports to each of which a computing device may be attached, and which is arranged to receive communications from said computing devices and to transmit said communications from the port or ports necessary for the communications to reach their intended destination(s), said device comprising means for determining, for each received communication, an intended destination address, storage means for storing a subset of the possible destination addresses and information regarding with which of said ports each of said subset is associated, and search means arranged to establish if said intended destination address is stored in said storage means, said search means comprising:

search table means comprising a main search table and a plurality of subsidiary tables having entries stored therein each entry in the main or a subsidiary search table comprising one of (i) a storage means of one possible destination address stored in said storage means, (ii) a pointer to a subsidiary search table from which a further entry should be recovered, and (iii) an end indication being neither a valid said storage means address nor a valid said pointer;

means arranged to recover one or more entries sequentially from said search table means beginning with said main search table on the basis of specified portions of said intended destination address until the recovered entry comprises either a said storage means address being the address of the only possible destination address stored in said storage means which matches said intended destination address in the specified portion or portions so far used, or a said end indication indicating that there are no such possible destination addresses stored in said storage means; and means arranged to confirm whether the one possible destination address identified in the former case is the same as said intended destination address.

7. A device according to claim 6 being a computer network device and in which said M-digit number is a MAC address.

8. A device according to claim 6 in which said specified portions are selected such that portions of said intended destination address which are more likely to vary in said stored subset are used before portions which are less likely to vary.

9. A device according to claim 6 in which said intended destination address is a binary number having 48 bits, the main search table having 65,536 entries and the first specified portion of said 48-bit number being a specified 16 bit portion.

10. A device according to claim 9 in which said 16 bit portion comprises the least significant 16 bits of said 48-bit binary number.

11. A device according to claim 9 in which each specified portion of the 48-bit binary number subsequent to the first specified 4 bit portion.

12. A method of establishing if a specified one of all possible M-digit numbers is stored in a storage means, said storage means being capable of storing a subset of all possible M-digit numbers, the method comprising:

providing a search table comprising a main search table and a plurality of subsidiary search tables having entries stored therein each entry the main or a subsidiary search table comprising one of (i) an address of one M-digit number stored in said storage means, (ii) a pointer to a subsidiary search table from which a further entry should be recovered, and (iii) an end indication being neither a valid said address nor a valid said pointer;

searching by recovering one or more entries sequentially from said search table means beginning with said main search table on the basis of specified portions of said M-digit number until the recovered entry comprises either a said address being the address of the only M-digit number stored in said storage means which matches said specified M-digit number in the specified portion or portions so far used, or a said end indication indicating that there are no such M-digit numbers stored in said storage means; and confirming, in the former case, whether the one M-digit number located is the same as said specified M-digit number.

13. A method according to claim 12 in which said specified portions are selected such that portions of said M-digit number which are more likely to vary in said stored subset are used before portions which are less likely to vary.

14. A method according to claim 12 in which said M-digit number is a binary number having 48 bits, the main search table having 65,536 entries and the first specified portion of said 48-bit number being a specified 16 bit portion.

15. A method according to claim 14 in which said 16 bit portion comprises the least significant 16 bits of said 48-bit number.

16. A method according to claim 14 in which each specified portion of the 48-bit number subsequent to the first is a specified 4 bit portion.

* * * * *

UNITED STATES PATENT AND TRADEMARK OFFICE
CERTIFICATE OF CORRECTION

PATENT NO. : 6,009,423
DATED : December 28, 1999
INVENTOR(S) : Paul J. Moran

It is certified that error appears in the above-identified patent and that said Letters Patent is hereby corrected as shown below:

Title page, insert the refollowing:
[30]   Foreign Application Priority Data
    October 30, 1996  [GB]   United Kindgom.....................9622535.4

Under claim 1, column 9, line 36, after "there", please insert --are--

In the Drawings:

Add Fig. 7

Signed and Sealed this

Twenty-sixth Day of December, 2000

Attest:

Q. TODD DICKINSON

Attesting Officer     Director of Patents and Trademarks